United States Patent [19]

Allen

[11] Patent Number: 5,535,290
[45] Date of Patent: Jul. 9, 1996

[54] METHOD AND APPARATUS FOR LIMITING THE NUMBER OF A COMPRESSED OUTPUT TYPE IN A COMPRESSION/DECOMPRESSION SYSTEM

[75] Inventor: James D. Allen, Castro Valley, Calif.

[73] Assignees: Ricoh Corporation, Menlo Park, Calif.; Ricoh Company Ltd., Tokyo, Japan

[21] Appl. No.: 526,758

[22] Filed: Sep. 11, 1995

Related U.S. Application Data

[63] Continuation of Ser. No. 107,376, Aug. 17, 1993, abandoned.

[51] Int. Cl.⁶ .................................................... G06K 9/36
[52] U.S. Cl. .......................................... 382/250; 358/433
[58] Field of Search .............................. 358/261.1, 261.3, 358/427, 432, 433; 348/403, 405, 408, 420; 382/232, 239, 250; H04N 1/415

[56] References Cited

U.S. PATENT DOCUMENTS

| | | | |
|---|---|---|---|
| 4,922,273 | 5/1990 | Yonekawa et al. | 358/429 |
| 5,051,840 | 9/1991 | Watanabe et al. | 358/432 |
| 5,086,488 | 2/1992 | Kato et al. | 382/56 |
| 5,140,621 | 8/1992 | Perron et al. | 375/122 |
| 5,142,380 | 8/1992 | Sakagami et al. | 358/432 |
| 5,262,854 | 11/1993 | Ng | 358/133 |
| 5,289,289 | 2/1994 | Nagasaki | 358/432 |
| 5,303,058 | 4/1994 | Fukuda et al. | 358/261.1 |

*Primary Examiner*—Leo Boudreau
*Assistant Examiner*—Andrew W. Johns
*Attorney, Agent, or Firm*—Blakely, Sokoloff, Taylor & Zafman

[57] ABSTRACT

A method and apparatus for reducing the necessary size of a buffer between two cascaded decoding stages is described. The present invention includes a method and apparatus for encoding data into multiple blocks of data. The present invention also includes a method and apparatus for encoding the multiple blocks of data into multiple symbols. This encoding includes a method and apparatus for limiting the multiple symbols to a predetermined number of symbols. By limiting the symbols encoded, the buffer after the decoding stage is limited so that the size of the buffer memory to buffer decompressed data output from the decoding stage is reduced.

27 Claims, 5 Drawing Sheets

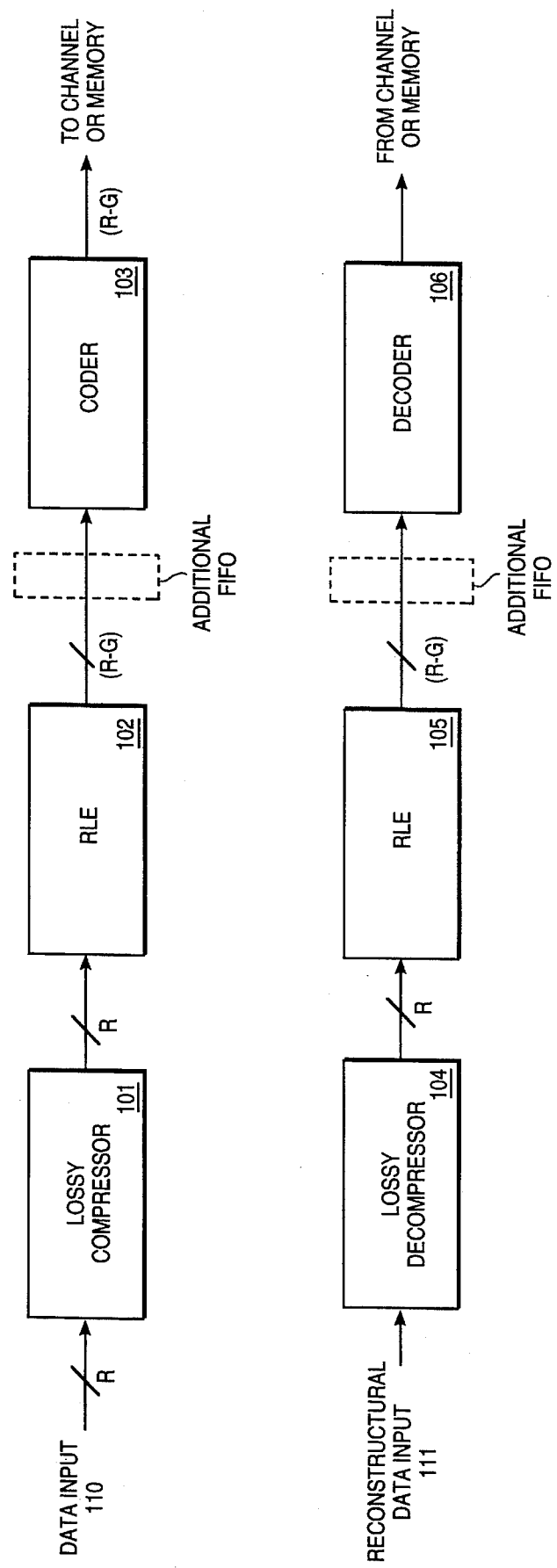
FIG_1 (PRIOR ART)

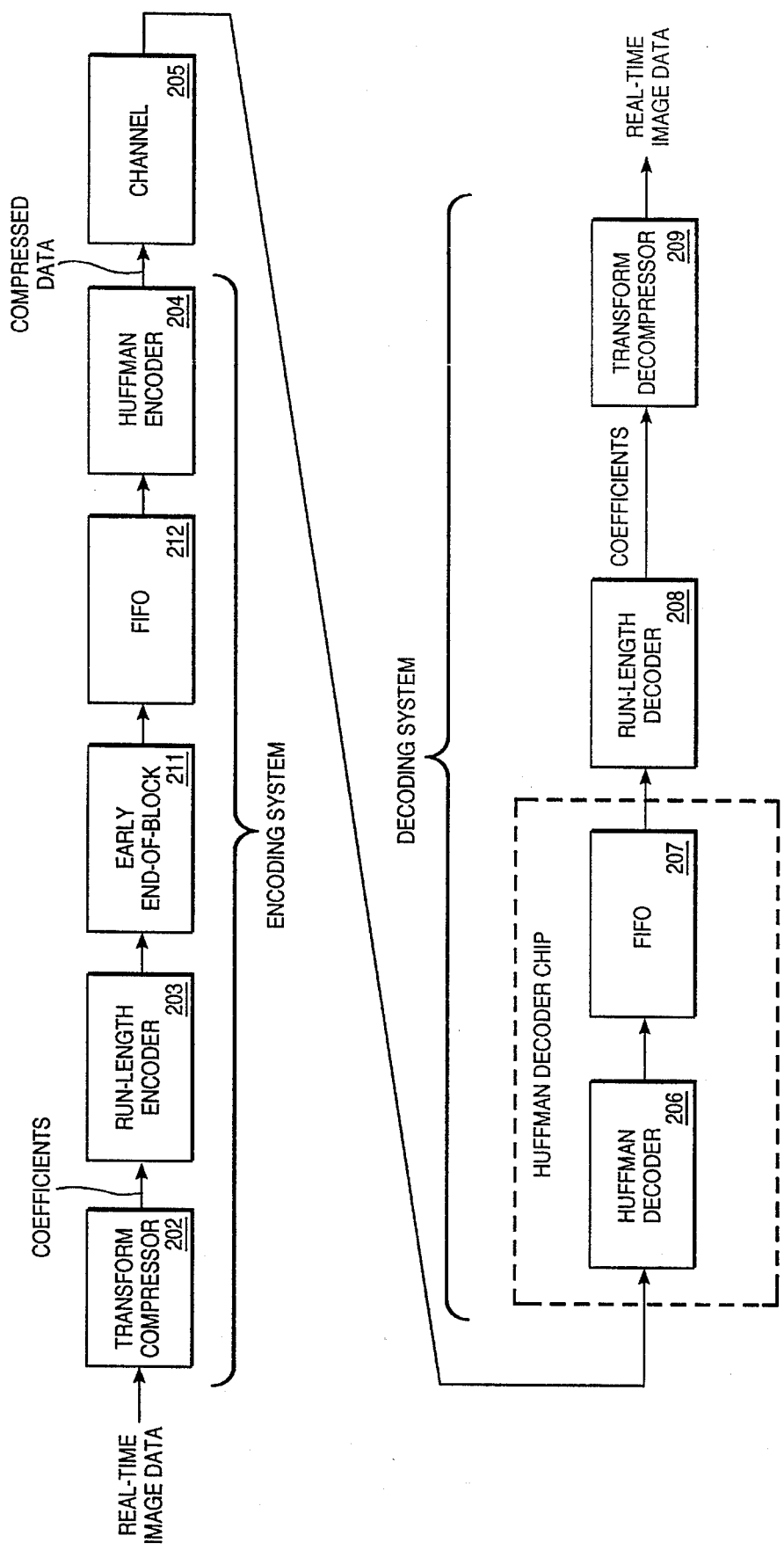
FIG_2

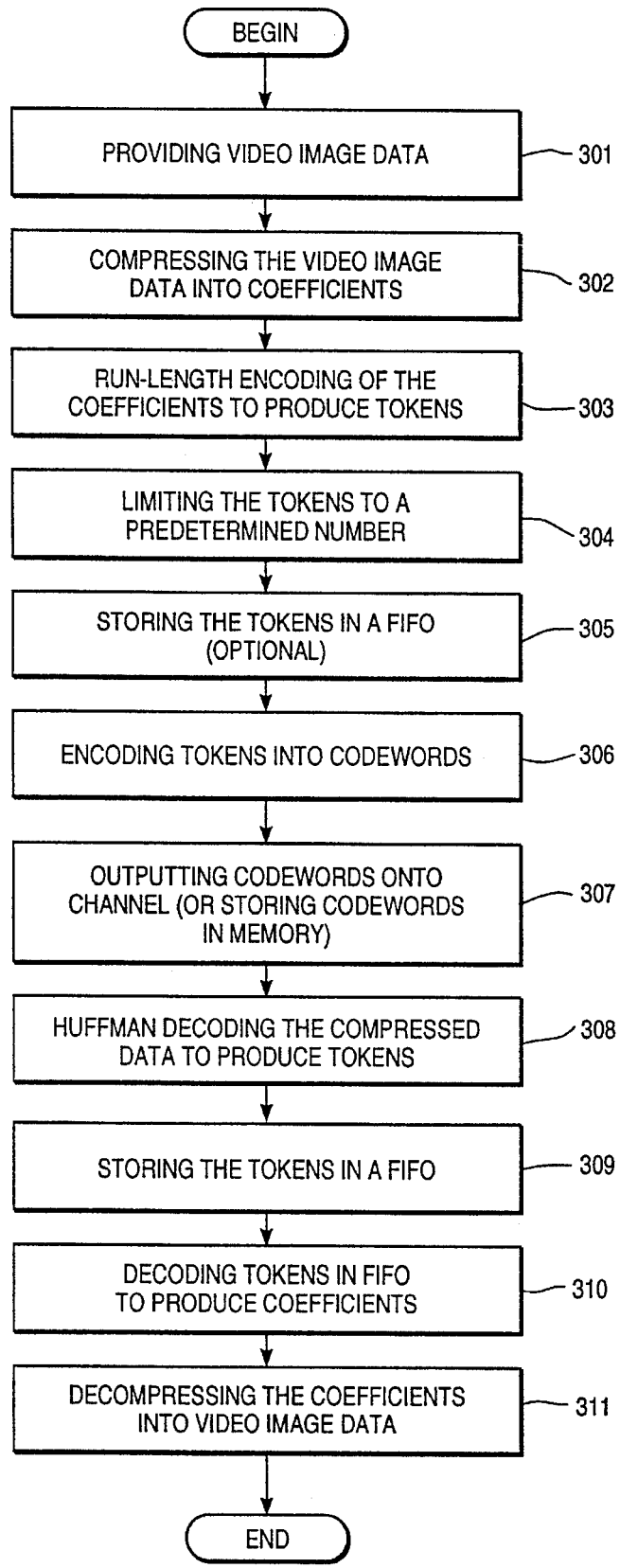
FIG_3

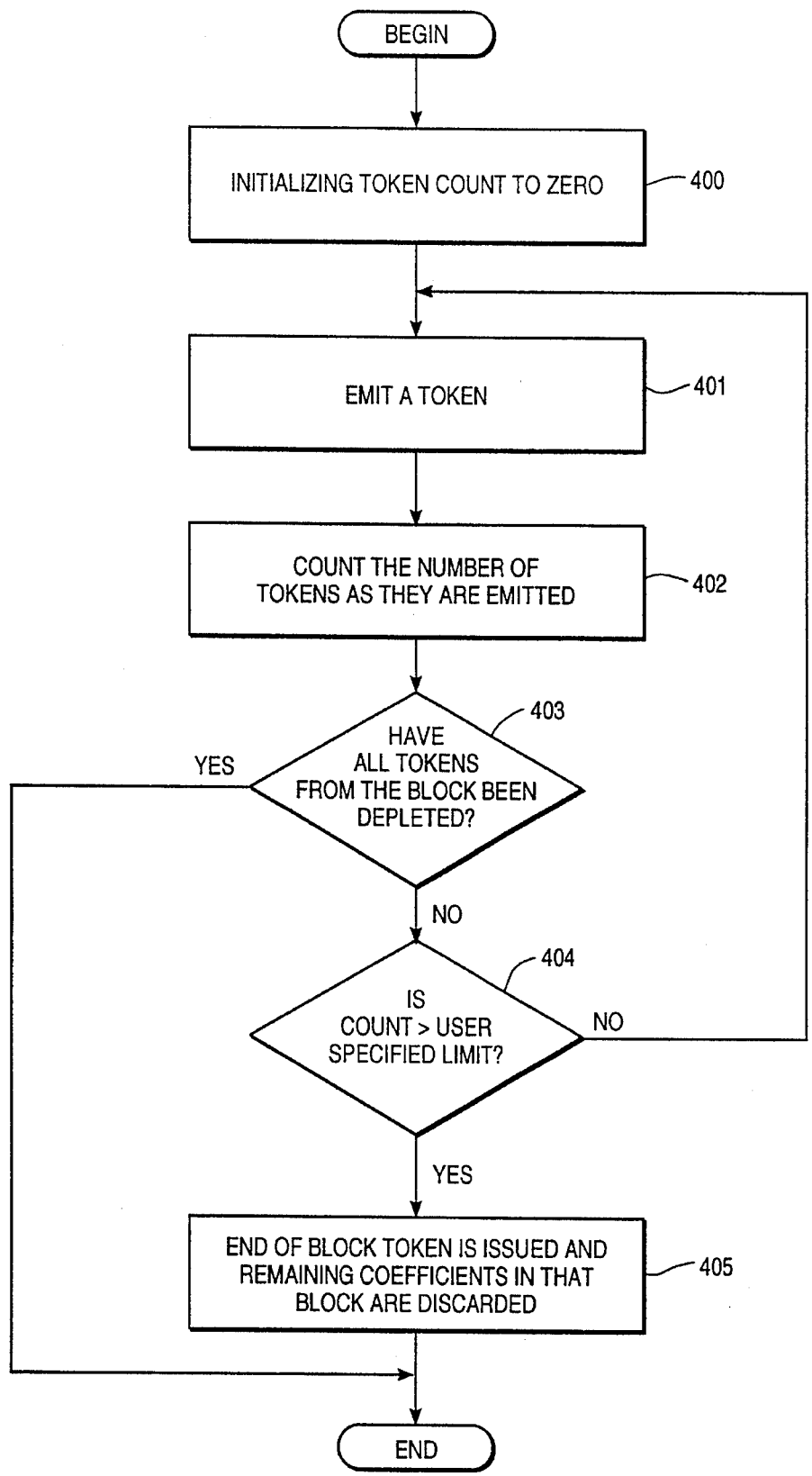
FIG_4

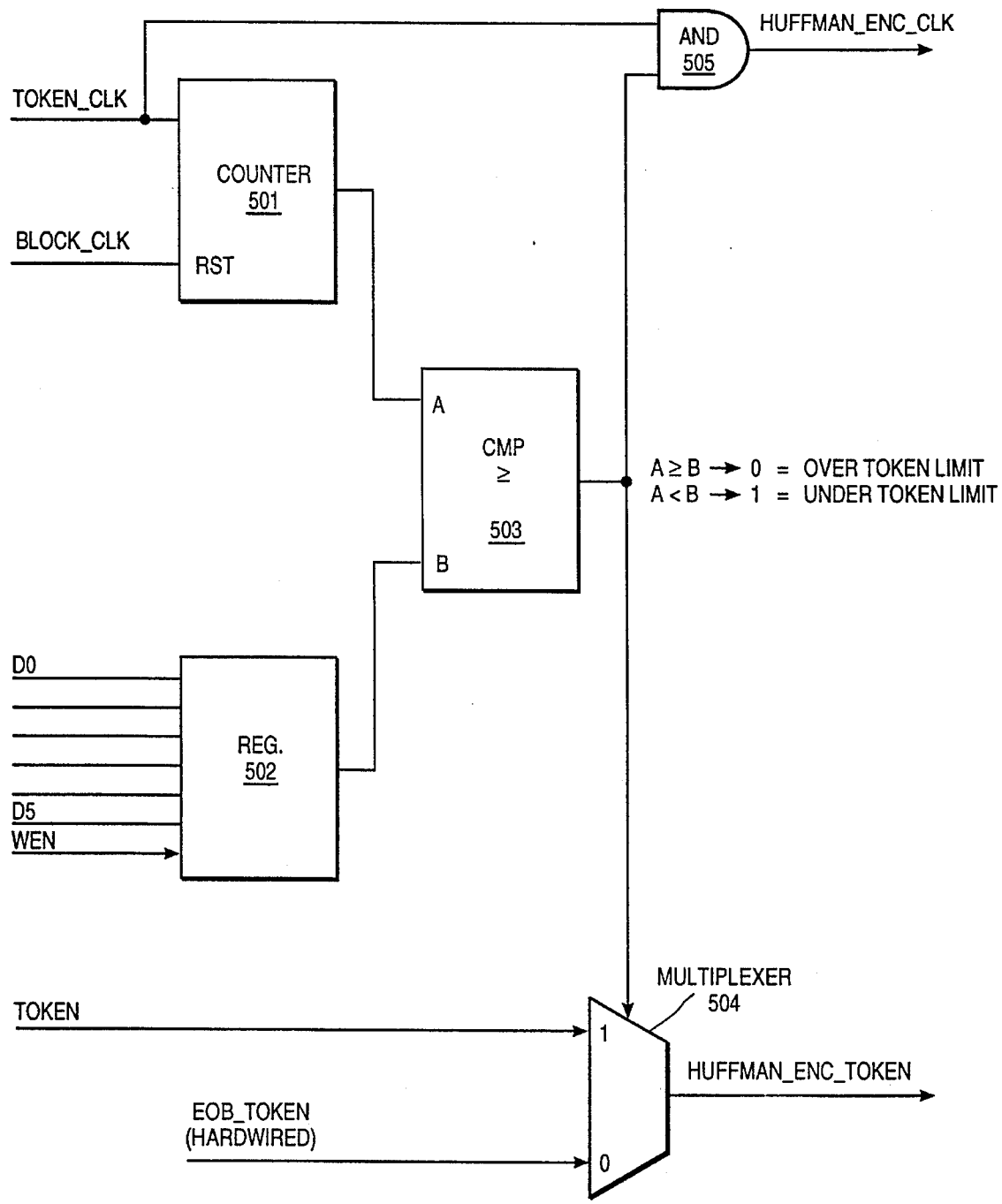
FIG_5

5,535,290

METHOD AND APPARATUS FOR LIMITING THE NUMBER OF A COMPRESSED OUTPUT TYPE IN A COMPRESSION/DECOMPRESSION SYSTEM

This is a continuation of application Ser. No. 08/107,376, filed Aug. 17, 1993, now abandoned.

FIELD OF THE INVENTION

This invention relates to the field of compression/decompression systems; more particularly, the present invention relates to decompression/compression systems having storage devices for buffering data between two separate decoding processes.

BACKGROUND OF THE INVENTION

Data compression schemes are widely used today in computer systems. These data compression schemes are comprised of stages coupled together to provide compression or decompression. The stages may include cascaded arrangements of data compression schemes. For example, the Joint Photographic Experts Group (JPEG) Still Image Compression Standard transforms the data with a two dimensional discrete cosine transform and then the coefficients are quantized. This is followed by differential pulse code modulation (DPCM) of the DC coefficients and run-length encoding of the AC coefficients. Finally, the results are Huffman coded. Since the decompression portion of a data compression system is the inverse of the compression portion, decoders are cascaded into consecutive stages as well.

Some data compression techniques are lossy. In a lossy compression technique, a portion of the input data is eliminated or quantized during compression, such that the compressed data cannot be decompressed into an exact duplicate of the input data. Lossy image compression is often accomplished using multiple stages. An example of such a system is shown in FIG. 1.

Sometimes these cascaded stages run at different rates. For real-time systems with cascaded asynchronous stages, buffering the data becomes a major design issue. Referring to FIG. 1, lossy compressor 101 receives data input 110 at a rate R. In one embodiment, lossy compressor 101 may be a transform code (TC) compressor that produces coefficients in response to the input data 110 at a set rate of R. The output of lossy compressor 101 is coupled to the input of run-length encoder (RLE) 102. Run-length encoder 102 receives and compresses the output from lossy compressor 101 at rate R. Run-length encoder 102 is a variable length encoder and produces tokens at an average, but not constant, rate of R-G in response to its input. The tokens output from run-length encoder 102 are coupled to the input of coder 103 which encodes the received tokens into codewords. These codewords are produced at an average rate of R-G. The codewords are then stored or transmitted on a channel.

Decompression of a compressed data stream using the system in FIG. 1 is very similar to the compression, with the exception that the stages are reversed. Decoder 106 receives the compressed data stream and produces tokens at an average, but not constant, rate R-G. The tokens are received by run-length encoder 105 which produces coefficients at a rate R. The coefficients are received by lossy decompressor 104 which produces a reconstructed data input 111.

As described, the stages in the lossy image compression system run at different rates. The rates of the stages are R and R-G, where R>G≧0. This is mainly due to the variable length coding (i.e., run-length encoder/decoder). If in this example, the coder and decoder can run at rate R, there is no problem since the stages can be operated synchronously. Otherwise, buffering is necessary to average the rate of the coder and decoder.

In the prior art, if a slower stage is incapable of operating at least in a burst rate R, a first-in/first-out (FIFO) buffer may be used. A FIFO buffer is a well-known asynchronous solution to interfacing between stages that operate at different rates. The FIFO buffer allows a preceding faster stage to operate at its maximum rate until the FIFO is full. The FIFO buffer essentially averages the rates of output codes.

The size of the necessary FIFO buffer depends on how long averaging is to occur. In other words, the size of the FIFO buffer determines the window of averaging. If the FIFO size is the size of the image, then the FIFO can accommodate all burst rates. However, the larger the size of the buffer, the larger the cost. Moreover, the increased size generally brings about a diminished return due to the minimal number of situations that are accommodated by the added size of the buffer.

Also, encoders and decoders are often implemented in application specific integrated circuits (ASICs). When a buffer is required, the buffer may be included in the same integrated circuit chip as the decoder. The size of the memory is directly related to the overall size of the chip. The larger the size of the buffer, the larger the size of the integrated circuit. Larger integrated circuits typically cost more. In order to keep the chip size reduced, thereby reducing the overall cost of the chip, it is desirable to reduce the buffer to the smallest size possible. Therefore, it is desirable to reduce the size of the buffer storage required to effectively reduce the cost of the system.

The present invention provides a method and apparatus for reducing the size of a buffer in a lossy data compression system. The present invention reduces the size of the buffer used between multiple stages in the decompression.

SUMMARY OF THE INVENTION

A method and apparatus for reducing the size of a buffer between two cascaded decoding stages is described. The present invention includes a method and apparatus for encoding data into multiple blocks of data. The present invention also includes a method and apparatus for encoding the multiple blocks of data into multiple symbols. This encoding includes a method and apparatus for limiting the multiple symbols to a predetermined number of symbols. By limiting the number of symbols encoded for each block, the buffer after the decoding stage is limited so that the size of the buffer memory to buffer decompressed data output from the decoding stage is reduced.

BRIEF DESCRIPTION OF THE DRAWINGS

The present invention will be understood more fully from the detailed description given below and from the accompanying drawings of the preferred embodiments of the invention, which, however, should not be taken to limit the invention to the specific embodiments, but are for explanation and understanding only.

FIG. 1 is a block diagram of a lossy image compression system.

FIG. 2 is a block diagram of one embodiment of the data compression system of the present invention.

FIG. 3 is a flow chart of the compression/decompression process of the present invention.

FIG. 4 is a flow chart of the process of the present invention.

FIG. 5 is a circuit schematic of the End of Block circuitry of the present invention.

DETAILED DESCRIPTION OF THE PRESENT INVENTION

A method and apparatus for compressing and decompressing data is described. In the following detailed description of the present invention numerous specific details are set forth, such as specific clock speeds, bit rates, buffer sizes, etc. in order to provide a thorough understanding of the present invention. However, it will be obvious to one skilled in the art that the present invention may be practiced without these specific details. In other instances well known methods, functions, components and procedures have not been described in detail as not to unnecessarily obscure the present invention.

The Compression/Decompression System of the Present Invention

FIG. 2 is a block diagram of one embodiment of the compression/decompression system of the present invention. The system depicted in FIG. 2 is a lossy compression system. The system operates very similar to the system in FIG. 1 in specific implementation of each of the blocks in FIG. 1 is included in FIG. 2. Referring to FIG. 2, real-time image data is received by transform compressor 202 which generates coefficients as outputs that are coupled to be received by run-length encoder 203. Run-length encoder 203 produces tokens which are received by early End of Block 211. Early End of Block 211 outputs tokens that are coupled to be received by FIFO 212. FIFO 212 is optional and is not required for the system to employ the present invention. Huffman encoder 204 is coupled to receive tokens from FIFO 212 and encodes the tokens to produce compressed data. The compressed data is output onto channel 205. Channel 205 may include a memory or storage device or, in other embodiments, may include a transmission medium.

From channel 205, the compressed data is coupled to be received by Huffman decoder 206. Huffman decoder 206 decodes the compressed data into tokens. The tokens output from Huffman decoder 206 are stored in FIFO 207. In the present invention, FIFO 207 may be a storage device or buffer other than a FIFO. The tokens stored in FIFO 207 are coupled to be received by run-length decoder 208. Run-length decoder 208 decodes the tokens into coefficients which are received by transform decompressor 209. The output of transform decompressor 209 is real-time image data.

Transform compressor 202, run-length encoder 203, early End-of-Block 211, FIFO 212 (optionally), and Huffman encoder 204 comprise the encoding portion of the system of the present invention. Huffman decoder 206, FIFO 207, run-length decoder 208 and transform decompressor 209 comprise the decoding portion of the system of the present invention.

In the present invention, Huffman decoder 206 and FIFO 207 are integrated into a single application specific integrated circuit (ASIC). Since FIFO 207 is on-chip, its size directly affects the overall size of the ASIC. The present invention limits the FIFO depth required for the data compression system. In one embodiment, the decoder FIFO depth of FIFO 207 is limited to 16 8-bit tokens and any additional bits associated with the token or required with a standard (e.g., JPEG). In this manner, the size of the ASIC is limited as well.

FIG. 3 is a flow chart of the operation of the system of FIG. 2. Real-time image data is received by transform compressor 102 in raster scan order (processing block 301). In one embodiment, transform compressor 202 compresses the image data using the JPEG standard (processing block 302). Transform compressor 202 initially segments the image into 8×8 blocks of pixels. Then transform compressor 202 applies a transform to each block to produce coefficients. In the present invention, transform compressor 302 applies a discrete cosine transform (DCT). In the present invention, these transform coefficients are then quantized non-uniformly to produce 64 quantized coefficients. The quantized coefficients are then presented in a zig-zag order to run-length encoder 203.

Run-length encoder 203 performs run-length encoding on the zig-zag sequence of coefficients to produce tokens (processing block 303). Run-length encoder 203 encodes a series of zero coefficients into a token having a category and a count indicating the number of zero tokens. In JPEG, there are three types of tokens. For each block, the DC coefficients result in a DC token. Any non-zero AC coefficient results in an AC token. AC tokens consist of two parts. One part of an AC token expresses the non-zero AC coefficient size. A second part of an AC token expresses a number of contiguous zero-value coefficients that preceded the non-zero AC coefficient in zig-zag order. An End of Block (EOB) token is emitted after the last non-zero coefficients in the block has been coded (unless the very last coefficient is non-zero).

The tokens are received by early End-of-Block circuit 211 which limits the number of tokens for a particular block to a predetermined number (processing block 304). This is accomplished in one embodiment by truncating any token over the predetermined number. The tokens may then be stored in FIFO 212 (processing block 305). Note that FIFO 212 is used to allow run-length encoder 203 and Huffman encoder 204 to operate synchronously when there is a rate mismatch between the two. If the data is encoded as it becomes available, such that the encoding portion of the system resembles a pipeline, FIFO 212 is not required.

The tokens are received by Huffman encoder 204 (from FIFO 212 or early End-of-Block 211 if FIFO 212 is not included in the system) which encodes the tokens into codewords (processing block 306). The codewords output from Huffman encoder 204 represent the compressed data and are output onto channel 205 or are stored in memory (processing block 307).

Decompression is the reverse of compression. The compressed data from channel 205 is received by Huffman decoder 206 which produces tokens (processing block 308). FIFO 207 stores the tokens until run-length decoder 208 is able to decode them (processing block 309). Run-length decoder 208 decodes the tokens from FIFO 207 to produce coefficients (processing block 310). These coefficients are received by transform decompressor 209 which decompresses them into image data (processing block 311).

In the present invention, FIFOs 212 and 207 are optional and may be included to provide an asynchronous solution to interfacing between stages that operate at different rates. For instance, FIFO 212 would be included when run-length encoder 203 and Huffman encoder 204 operate at different rates, while FIFO 207 would be included when Huffman decoder 206 and run-length decoder 208 operate at different rates.

The present invention limits the size of FIFO 207 by limiting the number of codewords which Huffman decoder 206 is to handle. In the present invention, the number of codewords that Huffman decoder 206 handles is limited by the number of codewords produced by Huffman encoder 204. The number of codewords produced by Huffman encoder 204 is directly related to the number of tokens it handles. To limit the number of tokens that are received to be encoded by Huffman encoder 204, the present invention truncates blocks having more than a predetermined number of tokens. Blocks with more than a predetermined number of tokens are truncated by forcing an end-of-block token when the number of tokens produced by run-length encoder 203 has reached a user selected threshold. In one embodiment, the predetermined number of tokens is 32 tokens per block. Since only non-zero coefficients will produce tokens, limiting the number of non-zero AC coefficient in each block reduces the FIFO requirements. Thus, by forcing an early End-of-Block token earlier than the normal end-of-block condition, the number of tokens per block at Huffman encoder 204 is directly limited.

The present invention could be used to reduce the size of FIFO 212 in the encoding portion of the system if there is a rate mismatch between run-length encoder 203 and Huffman encoder 204. In this case, the portion of the coefficients in a block that are greater than a predetermined number are truncated, such that the number of tokens that can be produced is limited to a predetermined maximum. In this manner, the number of tokens per block is directly limited.

The maximum number of tokens per block that the Huffman encoder or decoder is to handle may be determined according to the proportions between the differing rates of operation. For instance, if the lossy compressor runs at a rate of 20 MHz and the Huffman encoder runs at a 10 MHz token rate, the maximum average rate (R-G) that the Huffman encoder can handle is $$\frac{10\text{M tokens/s}}{20\text{M components/s}} \times \frac{64 \text{ components}}{\text{blocks}} = \frac{32 \text{ tokens}}{\text{block}}$$

where the components are coefficients in this example. Thus, in this example, the number of tokens/block is limited to 32. This system will also compensate for a decoder that runs at one-half the rate of the lossy compressor, whether or not the encoder does.

It should be noted that the present invention is not limited to compression and decompression systems that are block-based. Instead, the present invention may be used with other schemes in which the data is divided into predefined units. Also the present invention is not limited to use with coefficients and tokens and may be used with systems in which the units include some number of components.

Early End of Block Process

The process of the present invention is shown in FIG. 4. In the present invention, the process begins by initializing the token count to zero (processing block 400). In one embodiment, this occurs at the beginning of each block. Tokens are emitted as a result of the encoding process (processing block 401). Next, the present invention counts the number of tokens as they are emitted (processing block 402). A test determines if all of the tokens from the block have been depleted (processing block 403). If so, the processing of that block ends. If not, processing continues at processing block 404.

A test determines if the number of tokens outputted has reached the user specified limit (processing block 404). In one embodiment, the user specified limit is 32 tokens. When the user specified limit is reached for a given block, processing continues at processing block 405 where an end-of-block (EOB) token is issued and the remaining coefficients in that block are discarded. If the limit has not been reached, then the token is still emitted for encoding by the Huffman decoder and processing continues at processing block 401.

The output of the system is completely JPEG compatible. Furthermore, the present invention is adding a lossy stage before the lossless coder. By the addition of the lossy stage in the encoder, the present invention avoids a failure in the lossless stage in the decoder due to the rate mismatch.

It should be noted that discarding the remaining coefficient is analogous to quantizing the high frequency coefficients more heavily in those blocks. Note that only blocks with many high frequency coefficients are affected. Eliminating the high frequency coefficients results in little visual penalty to the reconstructed images.

Early End-of-Block Circuit Diagram

FIG. 5 is a block diagram of one embodiment of the circuitry required to perform the early end-of-block. Referring to FIG. 5, early end-of-block circuit 500 is comprised of counter 501, register 502, comparator 503, multiplexer 504 and AND gate 505. The enabling input of counter 501 is coupled to the TOKEN_CLK. The reset input of counter 501 is coupled to the BLOCK_CLK signal. The output of counter 501 is coupled to the A input of comparator 503. The B input of comparator 503 is coupled to the output of register 502. The input of register 502 comprises 6 data bit lines $D_0$–$D_5$ and a write enable (WEN) signal. The output of comparator 503 is coupled to one input of AND gate 505. The other input of AND gate 505 is coupled to the TOKEN_CLK signal. The output of AND gate 505 is the Huffman clock pulse, HUFFMAN_ENC_CLK. The output of comparator 503 is also coupled to the control input of multiplexer (MUX) 504. One input of MUX 504 are coupled to the tokens generated by Huffman decoder 504. The other input of MUX 504 is coupled to the end-of-block token (EOB_TOKEN). In one embodiment, the EOB_TOKEN is hardwired. In other embodiments, the EOB_TOKEN is programmed. The output of MUX 504 is the token to be Huffman encoded (HUFFMAN_ENC_TOKEN).

Counter 501 counts the number of tokens in each block via the TOKEN_CLK signal. Counter 501 is reset at the end of each block. In one embodiment, counter 501 is reset using the BLOCK_CLK signal which is asserted at the beginning of a new block. Register 502 contains the maximum number of tokens allowed. The value is written into register 502 by asserting the WEN signal. When the WEN signal is asserted, the bits on data inputs D0–D5 are latched and stored into register 502. In one embodiment, a register 502 is a 6-bit counter so that numbers from 0–63 may be stored.

Comparator 503 tests the value of counter 501 against the value in register 502. As long as the value in register 502 is greater than or equal to the value in counter 501, the output of comparator 503 is a "1" (e.g., high). The "1" output causes the selection of the tokens output of MUX 504, such that a Huffman encoded token is output. The "1" binary output of comparator 503 also enables AND gate 505 such that whenever the token clock goes high, a clock signal is effectively output from AND gate 505 as the Huffman encoded clock signal. If the value in counter 501 is greater than or equal to the value in register 502, the output of comparator 503 is a zero, thereby indicating that it is over the token limit. In this case, the token clock output from AND gate 505 is disabled due to one of the inputs of AND gate 505 being 0. Also, the "0" binary output of comparator 503 causes the zero input of MUX 504 to be selected, thereby outputting from MUX 504 the end-of-block (EOB) token. Thus, as long as the value in register 502 is greater than the value in counter 501, a token is generated. Otherwise, the end-of-block token is emitted and no other tokens are generated until counter 501 is reset by the true of end-of-block condition.

The early end-of-block circuit 500 may be disabled by initializing register 502 to one less than the number of pixels in the block. In one embodiment, where the blocks are 8×8 in size, placing a value of 63 in register 502 causes the early end-of-block circuit 500 to be disabled. This is due to the fact that the comparator will always output a 1 until the token count is 63 or greater. At this time, the end-of-block is automatically issued anyway. Therefore, a forced end-of-block token will never be produced.

In the present invention, the decoder remains unchanged. Therefore, in order to implement the present invention, no change is required in the decoding of the present invention. Therefore, pre-existing decoder chips and designs may already be utilized to implement the decoding portion of the system of the present invention.

The perceived image quality of the present invention is not depreciated due to the early end-of-block tokens system. In a JPEG system, the transform coefficients are quantized non-uniformly. Generally, the high-frequency coefficients are quantized more heavily because the human visual system is less sensitive to high spatial frequencies. By truncating only high frequency coefficients, the present invention takes advantage of this property to produce an image having essentially the same quality as an image compressed without the early end-of-block of the present invention as far as the human visual system is able to discern. Furthermore, the blocks which have many non-zero AC coefficients (and are therefore subject to truncation by early end-of-block) are visually noisy. The human visual system is insensitive to quantization of noisy image regions, so perceived image degradation will be low. Thus, the method and apparatus of the present invention directly limits the number of AC tokens per block from the encoder. In this manner, a decoder of a predetermined size may be achieved having little impact on the visual quality or bit rate of the system, at a reduced hardware cost.

Whereas many alterations and modifications of the present invention will no doubt become apparent to a person of ordinary skill in the art after having read the foregoing description, it is to be understood that the particular embodiment shown and described by way of illustration is in no way intended to be considered limiting. Therefore, references to details of the preferred embodiment are not intended to limit the scope of the claims which in themselves recite only those features regarded as essential to the invention.

Thus, a compression and decompression system has been described.

I claim:

1. A method of compressing a plurality of coefficients divided into a plurality of units in a data compression system, said method comprising the steps of:

presenting a predetermined number of coefficients to an encoder in a zig-zag order;

lossy encoding the plurality of coefficients into a plurality of tokens, including limiting the plurality of tokens corresponding to non-zero coefficients for each of the plurality of units to a predetermined number based on memory size used in decoding, such that tokens corresponding to non-zero coefficients that are generated after the predetermined number has been reached for each of the plurality of units are discarded in the zig-zag order; and lossless encoding tokens into a plurality of a second type of symbol to compress the data.

2. The method defined in claim 1 wherein the units comprise blocks.

3. The method defined in claim 1 wherein the data compression system includes a first decoder operating at a first rate, a memory, and a second decoder operating at a second rate different from the first rate coupled in a cascaded arrangement, wherein the plurality of tokens is limited, such that the size of the memory required to buffer data between the first decoder and the second decoder is minimized and allows the first decoder and the second decoder to interface with each other as the first decoder and second decoder operate asynchronously.

4. The method defined in claim 1 further comprising the step of buffering tokens using a memory means, wherein the plurality of tokens is limited, such that the size of the memory means required to buffer the tokens is minimized.

5. The method defined in claim 1 wherein the second type of symbol comprises a codeword.

6. A method for reducing the necessary size of a buffer memory to store data between a first decoder operating at a first rate and a second decoder operating at a second rate different than the first rate coupled in a cascaded arrangement in a data compression system, the method comprising the steps of:

encoding the data into a plurality of blocks having a plurality of coefficients;

encoding the plurality of blocks into a plurality of tokens, including the step of limiting tokens corresponding to non-zero coefficients to a predetermined number and forcing an end-of-block indication once the predetermined number has been reached, wherein the predetermined number is based on the size of the buffer memory to buffer decompressed data output from the first decoder.

7. The method defined in claim 6 wherein the predetermined number is user specified according to the size of the buffer memory.

8. The method defined in claim 6 wherein the step of limiting comprises the step of truncating tokens corresponding to non-zero coefficients in each of the plurality of blocks that are generated after the predetermined number has been reached.

9. The method defined in claim 6 wherein the step of limiting comprises the steps of:

counting tokens corresponding to non-zero coefficients to produce a count comparing the count to the predetermined number;

issuing an End-of-Block indication if the count is greater than the predetermined number, wherein the remainder of the block is discarded.

10. A compression/decompression method comprising the steps of:

compressing the image data to produce a plurality of blocks of a first plurality of coefficients;

encoding the first plurality of coefficients in each of the plurality of blocks to produce a plurality of tokens;

discarding tokens that occur after a predetermined number of tokens corresponding to non-zero coefficients;

encoding tokens into a plurality of codewords;

decoding tokens into a plurality of decoded tokens with a first decoder operating at a first rate;

buffering the plurality of decoded tokens in a buffer having a first size;

decoding the plurality of decoded tokens stored in the buffer with a second decoder operating at a second rate different than the first rate to generate a second plurality of coefficients; and decompressing the coefficients into the image data;

wherein tokens corresponding to non-zero coefficients are limited to the predetermined number based on the first size to ensure that the buffer supplies all the plurality of decoded tokens to the second decoder as the first and second decoders maintain operation at their respective rates.

11. The method defined in claim 10 wherein the step of encoding tokens comprises the step of Huffman encoding and the step of decoding tokens comprises Huffman decoding.

12. The method defined in claim 10 wherein the step of discarding comprises the steps of:

counting the number of tokens corresponding to non-zero coefficients encoded to produce a count;

comparing the count to the predetermined number; and outputting an End-of-Block indication if the count is greater than the predetermined number for the remainder of the block.

13. The method defined in claim 10 wherein the predetermined number is user specified according to the size of the buffer memory.

14. A compression system for compressing a plurality of coefficients comprising:

a first encoder for encoding the plurality of coefficients into a plurality of tokens;

a circuit for limiting the number of tokens comprising counter means for counting the number of tokens corresponding to non-zero coefficients, wherein the counter means produces a count of the number of tokens corresponding to non-zero coefficients;

storage means for storing a predetermined number selected based on buffer memory size in a decoder;

comparator means coupled to the storage means and the counter means for comparing the predetermined number and the count, wherein the comparator means outputs a signal in a first state if the count is greater than the predetermined number and outputs a signal in a second state if the count is less than or equal to the predetermined number; and multiplexer means having a first input and a second input and a control input, wherein the first input is coupled to the number of tokens, the second input is coupled to an End-of-Block indication and the control input coupled to receive the signal, wherein the multiplexer means outputs the End-of-Block token in response to the signal being in the first state and outputs tokens in response to the signal being in the second state;

a second encoder coupled to receive tokens from the circuit to encode tokens, such that the plurality of coefficients are compressed into compressed data.

15. A system comprising:

a first encoder for encoding the plurality of coefficients into a plurality of tokens;

a circuit for limiting the number of tokens comprising counter means for counting the number of tokens corresponding to non-zero coefficients, wherein the counter means produces a count of the number of tokens corresponding to non-zero coefficients;

storage means for storing a predetermined number;

comparator means coupled to the storage means and the counter means for comparing the predetermined number and the count, wherein the comparator means outputs a signal in a first state if the count is greater than the predetermined number and outputs a signal in a second state if the count is less than or equal to the predetermined number; and multiplexer means having a first input and a second input and a control input, wherein the first input is coupled to the number of tokens, the second input is coupled to an End-of-Block indication and the control input coupled to receive the signal, wherein the multiplexer means outputs the End-of-Block token in response to the signal being in the first state and outputs tokens in response to the signal being in the second state;

a second encoder coupled to receive tokens from the circuit to encode tokens to produce compressed data, such that the plurality of coefficients are compressed into the compressed data;

first decoder means for receiving the compressed data to produce a plurality of tokens, wherein the first decoder means operates at a first rate;

buffer memory means coupled to receive the plurality of tokens, wherein the buffer memory means is a predetermined size; and second decoder means coupled to receive the plurality of tokens from the buffer memory means for decoding the plurality of tokens, wherein the second decoder means is a variable length decoder that operates at a second rate, where the second rate is higher than the first rate;

wherein the predetermined number is based on the predetermined size of the buffer memory means to ensure that the buffer memory means supplies all decoded tokens to the second decoder while the first decoder and second decoder operate at different rates.

16. The system defined in claim 15 wherein the buffer memory means comprises FIFO.

17. The system defined in claim 15 wherein the buffer memory means stores the tokens.

18. The system defined in claim 15 wherein the predetermined number of tokens comprises 32 tokens.

19. The system defined in claim 15 wherein the first decoding means comprises a Huffman decoder.

20. The system defined in claim 15 wherein the second decoding means comprises a run-length encoder.

21. A system comprising:

a first encoder for encoding plurality of coefficients divided into a plurality of data units into a first plurality of tokens;

a mechanism to limit tokens coupled to the first encoder to produce a second plurality of tokens by limiting the first plurality of tokens corresponding to non-zero coefficients to no more than a predetermined number of tokens corresponding to non-zero coefficients for each data unit;

a second encoder coupled to the mechanism to encode the second plurality of tokens into compressed data;

a first decoder receiving the compressed data to produce a plurality of decoded tokens, wherein the first decoder operates at a first rate;

a buffer memory coupled to receive the plurality of tokens, wherein the buffer memory is a predetermined size; and a second decoder coupled to receive the plurality of tokens from the buffer memory to divide the plurality of tokens to produce a plurality of coefficients, wherein the second decoder is a variable length decoder that operates at a second rate, where the second rate is higher than the first rate;

a transform decompressor coupled to receive the plurality of coefficients to produce decompressed data;

wherein the predetermined number is selected based on the predetermined size of the buffer memory to ensure that the buffer memory means supplies all decoded tokens to the second decoder while the first decoder and second decoder operate at different rates.

22. The system defined in claim 21 wherein the buffer memory comprises FIFO.

23. The system defined in claim 21 wherein the buffer memory stores the tokens.

24. The system defined in claim 21 wherein the predetermined number of tokens comprises 32 tokens.

25. The system defined in claim 21 wherein the first decoder comprises a Huffman decoder.

26. The system defined in claim 21 wherein the second decoder comprises a run-length encoder.

27. The system defined in claim 21 wherein the transform decompressor comprises a JPEG compressor.

* * * * *